United States Patent [19]

Lee

[11] Patent Number: 4,680,343

[45] Date of Patent: Jul. 14, 1987

[54] CHLORINATED POLY(VINYL CHLORIDE) THERMOPLASTIC ALLOYS

[75] Inventor: Biing-lin Lee, Broadview Heights, Ohio

[73] Assignee: The B F Goodrich Company, Akron, Ohio

[21] Appl. No.: 844,639

[22] Filed: Mar. 27, 1986

[51] Int. Cl.$^4$ .............................................. C08L 69/00
[52] U.S. Cl. .................................... 525/148; 524/508; 525/146
[58] Field of Search ....................... 525/146, 148, 468; 524/508

[56] References Cited

U.S. PATENT DOCUMENTS

| | | | |
|---|---|---|---|
| 2,996,489 | 8/1961 | Dannis et al. | 260/92.8 |
| 3,100,762 | 8/1963 | Shocknev | 260/92.8 |
| 3,334,077 | 8/1967 | Gateff | 260/92.8 |
| 3,334,078 | 8/1967 | Gateff | 260/92.8 |
| 3,506,637 | 4/1970 | Makino | 260/92.8 |
| 3,534,013 | 10/1970 | Wakabayashi et al. | 260/92.8 |
| 3,591,571 | 7/1971 | Steinbach-Van Gaver | 260/92.8 |
| 3,882,192 | 5/1975 | Elghani et al. | 525/67 |
| 4,049,517 | 9/1977 | Adachi et al. | 204/159.18 |
| 4,105,711 | 8/1978 | Hardt et al. | 260/873 |
| 4,239,861 | 12/1980 | Braese et al. | 525/151 |
| 4,377,459 | 3/1983 | Parker | 204/159.18 |
| 4,412,898 | 11/1983 | Olson et al. | 204/159.18 |
| 4,459,387 | 7/1984 | Parker | 525/331.6 |
| 4,515,925 | 5/1985 | Kleiner et al. | 525/439 |

*Primary Examiner*—Theodore E. Pertilla
*Attorney, Agent, or Firm*—James R. Lindsay; Daniel J. Hudak

[57] ABSTRACT

A process and a composition for preparing chlorinated poly(vinyl chloride) alloys containing aromatic polycarbonates, ethylene-based functional polymers, and impact modifiers is described. The alloys have good thermo-mechanical properties such as good dimensional stability under heat, good impact resistance, good ductility, and the like. Although the percent of chlorine of the chlorinated poly(vinyl chloride) is 57% or greater by weight, the alloys can be melt-processed at relatively low temperatures, that is approximately at 230° C. or less.

20 Claims, No Drawings

CHLORINATED POLY(VINYL CHLORIDE) THERMOPLASTIC ALLOYS

TECHNICAL FIELD

The present invention relates to thermoplastic alloys containing chlorinated poly(vinyl chloride) having a chlorine content of at least 57% by weight. More specifically, the present invention relates to chlorinated PVC containing alloys which have low temperature processing properties.

BACKGROUND OF THE INVENTION

It is well known that a chlorinated vinyl polymer referred to as chlorinated polyvinyl chloride, hereinafter CPVC, has excellent high temperature performance characteristics, among other desirable physical properties. Typically, commercial CPVC has in excess of about 57 percent by weight (% by weight) bound chlorine, and is most conveniently prepared by the chlorination of polyvinyl chloride as described in U.S. Pat. Nos. 2,996,489; 3,100,762; 3,334,077; 3,334,078; 3,506,637; 3,534,013; 3,591,571; 4,049,517; 4,350,798; 4,377,459; 4,412,898; and 4,459,387 inter alia.

The term CPVC is used herein to define a chlorinated vinyl chloride polymer having in excess of about 57% by weight bound chlorine.

Chlorinated PVC (CPVC) has become an important specialty polymer due to its relatively low cost, high glass transition temperature, high heat distortion temperature, outstanding flame and smoke properties, chemical inertness and low sensitivity to hydrocarbon feed stock costs. The glass transition temperature of CPVC generally increases as the percentage of chlorine increases. However, a well known undersirable characteristic of CPVC resin is that it inherently has low impact properties, a characteristic which is also common to vinyl chloride homopolymers. Also, as the chlorine content increases, the CPVC resin becomes more difficult to melt process, and also becomes more brittle.

The poor melt processability of CPVC resins is exemplified by milling CPVC on a roll mill which results in high torque and high temperatures as well as decomposition of the CPVC. Softening additives or plasticizers have been added to CPVC in order to improve its processability. Although its processability is somewhat improved, these additives produce undesirable effects. Some of the more significant detrimental effects produced by inclusion of these softening or plasticizer additives are lower heat distortion temperatures, softness and weakness in terms of lower tensile strength, and less desirable chemical properties than that exhibited by CPVC alone. These negative attributes of the additives on CPVC limit usefulness of the modified CPVC in the manufacture of rigid plastic articles.

The burgeoning demand for CPVC pipes, vessels, valve bodies and fittings, and the fact that an impact-deficient CPVC matrix can be improved by compounding and alloying it with other polymers, has instigated concerted efforts to develop better impact modified CPVC compositions having increased heat distortion temperatures, and increased ease of melt-processing. Most of these efforts have been channeled toward rigid CPVC applications where acceptable impact strength and dimensional stability under heat are critical. Such applications include the manufacture of exterior structural products, rigid panels, pipe and conduit, injection-molded and thermoformed industrial parts, appliance housing, and various types of containers both large and small.

U.S. Pat. No. 3,882,192 to Elghani, et al relates to molding compositions consisting of from 5 to 95 parts by weight of a polycarbonate, from 5 to 95 parts by weight of a vinyl chloride polymer, and from 5 to 95 parts by weight of an ABS graft polymer, a styrene/maleic anhydride copolymer or an ethylene/vinyl acetate copolymer. Molding compositions are made by solution casting, that is by seperately dissolving each component in a suitable inert organic solvent. The three components can then be mixed together and the molding composition isolated from the solutions by precipitation with non-solvents or by removal of the solvents by distillation. Processing of the molding compositions is carried out at a temperature of about 250° C. In addition to high processing temperatures, which is too high for processing of high chlorine CPVC, no mention is made of the utilization of an ethylene-based functional polymer.

U.S. Pat. Nos. 4,105,711; 4,239,361; and 4,515,925 while relating to polymer mixtures containing polycarbonate, do not utilize any ethylene-based functional polymer.

At present, no entirely satisfactory means is available for improving properties such as impact strength, heat distortion temperatures, improved ease of melt processing of chlorinated PVC resins, or any combination thereof.

Since PVC processes easily and CPVC does not, since CPVC has heat resistance but PVC does not, and furthermore, since CPVC has a high melt viscosity but PVC does not, it should be apparent that CPVC and PVC are different materials and that PVC prior art is not analogous to patentability issues relating to CPVC.

SUMMARY OF THE INVENTION

It is therefore a general aspect of this invention to provide thermoplastic blends containing chlorinated poly(vinyl chloride)polymers, polycarbonate polymers, ethylene-based functional polymers, optional impact modifiers, and optional viscosity improver polymers.

It is another aspect of the present invention to provide thermoplastic blends, as above, wherein the amount of chlorination of said chlorinated poly(vinyl chloride)polymers is at least 57% by weight.

It is a further aspect of the present invention to provide thermoplastic blends, as above, which are melt processable at relatively low temperatures (i.e. below 230° C.) and have good physical properties such as impact resistance, flame retardancy, high heat distortion temperatures, and the like.

It is a still further aspect of the present invention to provide thermoplastic blends, as above, which are prepared by initially melt mixing the polycarbonate with the ethylene-based functional polymer to obtain a premixture and mixing the premixture at a temperature not higher than 230° C. with the remaining constituents, that is, the clorinated poly(vinyl chloride) and heat stabilizers.

In general, a thermoplastic high impact polymer alloy composition comprises from about 20% to about 70% by weight of a chlorinated poly(vinyl chloride) containing from about 57% to about 75% by weight of chlorine therein; from about 10% to about 80% by weight of an aromatic polycarbonate; an optional impact modifier having a glass transition temperature of less than 0° C., the amount of said impact modifier being an effective alloy amount to improve the Izod notch impact strength of the polymer alloy composition; and optional viscosity improver polymer, the amount of said viscosity improver polymer being from about 0.5% to about 20% by weight; an effective amount of an ethylene-based functional polymer so that the polymer alloy has an Izod notch impact strength of at least 1.0 ft-lb/in; and wherein said alloy amount is based upon the total weight of said chlorinated poly(vinyl chloride), said polycarbonate, said optional impact modifier, said optional viscosity improver, and said ethylene-based functional polymer.

DETAILED DESCRIPTION OF THE INVENTION

The thermoplastic polymer alloy of the present invention generally contains a chlorinated poly(vinyl chlorine), a polycarbonate, an ethylene-based functional polymer, an optional impact modifier and an optional viscosity improver.

The chlorinated poly(vinyl chloride), i.e. CPVC, resins of the present invention include any postchlorinated poly(vinyl chloride), hereinafter CPVC, containing at least 57% by weight of chlorine. The CPVC resins desirably contain from about 57% to about 75% of chlorine by weight and preferrably from about 63% to about 72% of chlorine by weight. Generally, any poly(vinyl chloride) (PVC) can be utilized for chlorination having an intrinsic viscosity, obtained utilizing a 99% by weight tetrahydrofuran solution with the PVC being the remaining 1% by weight, of from about 0.46 to about 1.4 and desirably from about 0.54 to about 1.0. The PVC can be prepared in any conventional manner such as by suspension, emulsion, or mass polymerization. Such methods of preparation are well known to the art as well as to the literature. The chlorination process can be carried out according to any method such as by a solution process, a fluidized bed process, a water slurry process, a thermal process, or a liquid chlorine process. Inasmuch as CPVC resins are known to the art as well as to the literature, they will not be discussed in great detail herein. Rather, reference is hereby made to the several CPVC patents set forth in the background, e.g. U.S. Pat. Nos. 2,996,489; 3,100,762; etc., which are hereby fully incorporated by reference with regard to suitable types of CPVC which can be utilized as well as to methods of preparation, and the like.

The CPVC resins utilized in the present invention generally have a density of from about 1.45 to about 1.67 gm/cc at 25° C. and a glass transition temperature (Tg) of from about 95° C. to about 200° C. Such Tgs are at least 20° C. higher than the glass transition temperature of unchlorinated PVC resins. The glass transition temperature was measured by a differential scanning calorimeter.

The preferred CPVC resins have densities in the range of from about 1.55 to about 1.60 gm/cc at 25° C. and a glass transition temperature of at least 100° C.

Based upon the total amount of the above polymers forming the thermoplastic alloy blend of the present invention, the amount of the CPVC resins therein is from about 20% to about 70% and desirably from about 30% to about 65% by weight. Inasmuch as the thermoplastic alloy can be either polycarbonate rich or CPVC rich, the preferred amount of CPVC will vary accordingly. In the polycarbonate rich embodiment, the preferred amount of the CPVC will be from about 10% to about 50% by weight. In the CPVC rich embodiment, the preferred amount of CPVC will be from about 50% to about 70% by weight. It is to be understood that such weight percentages is based upon only the polymer alloy and not upon any additives, stabilizers, etc.

The polycarbonate utilized in the polymer alloy composition of the present invention is an aromatic polycarbonate. The thermoplastic polymer alloy of CPVC and polycarbonate is generally a two-phase system. That is, a single overall glass transition temperature Tg, is not obtained. Depending upon whether the thermoplastic polymer alloy is CPVC rich or polycarbonate rich, the rich component will often exist in a continuous phase. The non-rich phase will often exist as a discontinuous phase within the continuous phase. Should generally equal amounts of these two polymers be utilized, portions of a continuous phase as well as a discontinuous phase of each material within the overall polymer alloy will often exist. Inasmuch as the CPVC and the polycarbonate polymers are partially compatible, small homogeneous phases will also exist. It is thus to be understood that various continuous, discontinuous, and even small homogeneous phases can exist within the polymer alloy but that the overall polymer alloy system will generally contain two separate and distinct phases.

The aromatic polycarbonates of the present invention generally have a low molecular weight, that is a weight average molecular weight of from about 10,000 to about 200,000 and preferably from about 10,000 to about 30,000. Aromatic polycarbonates include various homopolycarbonates, various copolycarbonates and/or mixtures of various homo- and copolycarbonates. The amount of such aromatic polycarbonates is from about 10% to about 80% by weight and desirably from about 30% to about 70% by weight based upon the total weight of the various polymers forming the thermoplastic polymer alloy. When a CPVC rich composition is desired, the amount of the polycarbonate is from about 20% to about 50% by weight based upon the total weight of the alloy forming polymers. When a polycarbonate rich alloy is desired the amount of the aromatic polycarbonate is from about 60% to about 80% by weight.

The specific types of aromatic polycarbonate utilized are generally not critical to the present invention provided that they are utilized in an amount and have a molecular weight as set forth herein above. Accordingly, various conventional types of aromatic polycarbonates can be utilized as well as other polycarbonates known to the art and to the literature. As part of the literature, numerous polycarbonate patents exist and the specific types of aromatic polycarbonate set forth therein can be utilized.

Suitable aromatic polycarbonates which can be utilized are set forth in U.S. Pat. No. 4,515,925 which is hereby fully incorporated by reference. Generally, such aromatic polycarbonates are made from diphenols corresponding to the formula

HO—Z—OH wherein Z represents a divalent mono- or polynuclear aromatic radical having from 6 to 30 carbon atoms, and is constructed such that each of the two OH groups is directly bound to a carbon atom of an aromatic system.

Examples of other types of polycarbonates are set forth in U.S. Pat. Nos. 3,544,514; 4,005,037; 4,105,711;

4,239,861; and 4,513,119, all of which are hereby incorporated by reference with regard to the preparation of the various polycarbonates as well as the different types thereof.

A description of other suitable polycarbonates is set forth in the Kirk-Othmer Encyclopedia of Chemical Technology, third edition, Volume 18, pages 479–494, Wiley 1982, New York, which is hereby fully incorporated by reference with regard to all aspects thereof.

In polycarbonates, groups of dihydric or polyhydric phenols are linked through carbonate groups. Typically, polycarbonates are derived from biphenol A and diphenyl carbonate through an ester exchange. Polycarbonates can also be made utilizing small amounts of other polyhydric phenols. The polycarbonates of the present invention are usually melt processble at temperatures of from about 260° C. to about 300° C. Such temperatures are generally too high for melt mixing or blending with CPVC resins.

Aromatic polycarbonates are commercially available with specific examples including General Electric Lexan polycarbonates, desirably Lexan High Flow; Dow Chemical's Calibre polycarbonates, and preferably such high melt flow polycarbonates; and Mobay Chemical's Merlon polycarbonate resins, preferably Merlon FCR series.

Ethylene-based functional polymers are utilized to reduce the processing temperature, to reduce the melt viscosity of the polycarbonate and also to impart high impact properties to the polymer alloy. Desirably, an effective amount is utilized such that the Izod notch impact strength of the polymer alloy is at least 1.0 ft-lbs/inch and desirably at least 2.0 ft-lbs/inch or greater and the processing temperature is 230° C. or less, desirably 220° C. or less and preferably 215° C. or less. Generally, the ethylene-based functional polymer is premixed with the polycarbonate at a temperature of about or below 220° C. Usually, an effective amount is from about 1% to about 15%, and preferably from about 3% to about 10% by weight of the ethylene-based functional polymers based upon the total weight of compounds forming the polymer alloy, that is the CPVC, the aromatic polycarbonate, the optional impact modifier, the optional viscosity improver, and the ethylene-based functional polymer.

Large improvements in impact strength and/or decreases in processing temperatures are unexpectedly obtained when the ethylene-based functional polymer is premixed with the aromatic polycarbonate. Although the viscosity improver can also be mixed therewith, it is generally mixed with the CPVC. While not being intended to be bound to theory, it is thought that the ethylene type functional polymer reduces the viscosity of the polycarbonate and thus can lower the processing temperature. Mixing of the polycarbonate premixture can occur by utilizing any conventional melt method. For example, the various premixture components can be mixed on a two-roll mill, in a compounding screw extruder, in a twin screw extruder, and the like. Regardless of mixing method, the temperature is such to generally produce a melt mixture of from about 210° to about 230° C., desirably from about 210° to about 220° C., and preferably from about 215° to about 220° C.

A stabilized CPVC premixture can also be made and contains the CPVC, a heat stabilizer, the optional impact modifiers, and the optional viscosity improvers. The CPVC premixture can also contain small amounts of the ethylene-based functional polymers although such is desirably utilized in the polycarbonate premixture. Mixing of the CPVC premixture can occur in any conventional melt mixing method such as by extrusion mixing, roll mill mixing, and the like. The temperatures are maintained generally below 230° C. and preferably below 220° C. Otherwise, the CPVC tends to degrade or to decompose. If this occurs, the overall polymer alloy will have poor physical properties. The CPVC premixture is then mixed with the polycarbonate premixture in any conventional melt mix manner, for example extrusion mixing, roll mill mixing, etc., at comparatively low temperatures, that is generally at temperatures of 230° C. or less and preferably at 220° C. or less.

The polymer alloy is preferably made utilizing the polycarbonate premixture, since as noted above, surprisingly good high impact properties and relatively low processing temperatures are achieved. In contrast thereto, should all the various components be simultaneously mixed together, high mixing temperatures, that is generally in excess of 220° C. and usually in excess of 230° C. are required with resulting deleterious effects upon the CPVC compound. Simultaneous mixing, furthermore, does not result in producing a polymer alloy having good impact strength. Accordingly, it is a prefered aspect of the present invention to utilize the premixture process. In addition to having good impact resistant properties, the properties of the polymer alloy of the present invention include good ductility, good flame retardancy, good high heat distortion temperatures, and also good thermal and color stability. The polymer alloys of the present invention can thus be utilized wherever such properties are desired, for example in structural plastics, calendering sheet and injection molding for equipment housings, and the like.

The ethylene-based functional polymer is generally a copolymer of ethylene and at least one other monomer containing functional groups thereon. Generally, the remaining comonomer can be a vinyl ester having a total of from 1 to about 10 carbon atoms with acetate being preferred. The amount of the vinyl ester component of the ethylene-based functional copolymer is from about 5 to about 50% by weight and desirably from about 10 to about 35% by weight. The ethylene-vinyl ester copolymers are often utilized as a blend with a small amount of another ethylene copolymer. The additional monomers of the second copolymer which contains functional groups are usually vinyl organic acids or organic anhydrides. For example, the additional comonomer can be acrylic acid, methacrylic acid, and various hydrocarbon derivatives thereof as well as maleic anhydride, or various derivatives thereof, wherein said acids and said anhydrides have a total of from 3 to 12 carbon atoms. Methacrylic acid is a preferred comonomer. The additional monomer of the second copolymer generally exists in a small amount as from about 1% to about 25% by weight based upon the total weight of the second or additional copolymer. When utilized, the amount of the second copolymer is generally small, as from about 0 or 1% to about 50% by weight and desirably from about 5% to about 40% by weight. Thus, the amount of the ethylene-vinyl ester copolymer exists in amount of from about 50% to about 100% by weight and preferably from about 60% to about 95% by weight. Other types of ethylene-based functional polymers or copolymers are set forth in U.S. Pat. No. 4,230,830, which is hereby fully incorporated by reference. This patent relates to a polymer blend consisting essentially of a. about from 80–99% by weight of a first olefinic polymer selected from
   (i) non-polar ethylene polymers and copolymers having a density of about from 0.930 to 0.965 g/cc and
   (ii) copolymers of ethylene having up to about 30 weight percent of at least one ethylenically unsaturated ester having from 4 to 12 carbon atoms; and
b. about from 1–19% of a second olefinic polymer selected from the group consisting of
   (i) non polar ethylene polymers and copolymers having a density of about from 0.945 to 0.965 g/cc and
   (ii) terpolymers of ethylene, at least one a-olefin having from 3–6 carbon atoms, and at least one non-conjugated diene; the second olefinic polymer being thermally grafted with an unsaturated acid or anhydride to give a copolymer having about from 0.02 to 4.0 weight percent of grafted succinic groups, provided, however, that when the second olefinic polymer is (ii), then the first olefinic polymer is (ii).

Regardless of whether or not a second or a terpolymer ethylene-based functional copolymer is utilized, as described in the preceding paragraph the melt index of the overall ethylene-based functional polymer, that is an ethylene-vinyl ester copolymer or blends thereof, is from about 2 to 40 g/10 min and desirably from about 6 to about 25 g/10 min. The density is from about 0.92 to about 1.1 g/cc and desirably from about 0.92 to about 0.96 g/cc. The ethylene-based functional polymer or blends thereof useful in the present invention are available from DuPont under the name Bynel CXA resins such as CXA resin 1123 and/or resin 1124. A specific example of a suitable ethylene-based functional polymer is a blend of 92.5% by weight of an ethylene-vinyl acetate copolymer containing 28% by weight of vinyl acetate therein and 7.5% by weight of an ethylene-methacrylic acid copolymer containing 15% by weight of methacrylic acid therein.

The impact modifiers of the present invention which can be optionally utilized in the CPVC premixture are generally added in an effective amount which helps improve the impact strength, for example, the Izod notch strength of the polymer alloy. Such amounts when utilized generally range from about 1 to about 25%, desirably from about 2 to about 15% and preferably about 3 to about 5% by weight based upon the total weight of the polymer alloy forming compounds. Suitable impact modifiers which can be utilized in the present invention have a Tg of generally 0° C. or less and very often a much lower Tg is desirable. As known to the art as well as to the literature, many polymeric compounds which could impart good impact strength for rigid PVC can be utilized. Accordingly, various impact modifiers which impart improved impact resistance to the polymer alloy can be utilized including those known to the literature, such as for example those set forth in The Encyclopedia of PVC, Volume 2, Chapter 12, Marcel Dekker, Inc., New York, 1977, which is hereby fully incorporated by reference. Examples of specific impact modifiers include the various acrylonitrile-butadiene-sytrene (ABS) polymers, the various chlorinated polyethylenes, the various acrylic rubbers, the various poly(ethylene-co-vinyl acetates, the various styrene-butadiene-styrene block copolymers, poly(methyacrylate-co-butadiene-co-styrene) (MBS), and the like. Impact modifiers of these types are commercially available. Preferred impact modifiers include ABS, MBS, and chlorinated polyethylene.

Various viscosity improvers can optionally be utilized in the present invention. Generally, effective amounts are utilized to reduce the viscosity of the polymer alloy and more specifically to reduce the viscosity of the CPVC compound as in the CPVC premixture. Such compounds also tend to prevent the CPVC from degrading and hence also stabilize the same. Effective amounts, when utilized, can be from about 0.1 to about 20% by weight, desirably from about 0.5 to about 10% by weight and preferably from about 3 to about 10% by weight based upon the total weight of the polymer alloy forming compounds as defined hereinabove. Such viscosity improvers are known to the art as well as to the literature. Examples of such various types include conventional compounds such as the various styrene-acrylonitrile copolymers, for example those described in the Encyclopedia of Polymer Science and Engineering, Volume I, pages 452–470, 1985, John Wiley & Sons, Inc., New York; a polymer of alpha methylstyrene, styrene, methyl methacrylate, or an acrylonitrile as described in U.S. Pat. No. 4,304,884 to Okamoto.

Other viscosity improvers include various lubricants such as low molecular weight oxidized polyethylenes, stearic acid, low molecular weight polyethylene, and the like. Although these types of viscosity improvers can be utilized, it is to be understood that various other types can be utilized and that such are known to the literature as well as to the art. The important aspect is that they generally lower the viscosity and hence also improve the stability of the CPVC compounds.

In addition to the above polymer alloy forming compounds, the CPVC premixture according to the present invention preferably comprises a CPVC resin which has been premixed with heat stabilizers. The stabilization of CPVC resins and compounds finds their roots in PVC stabilization technology. Consequently, the stabilizers being used for CPVC resins are based on, for example, lead, barium and/or cadmium, calcium and/or zinc and organotin stabilizers. Among these, organotin stabilizers are widely used. Other secondary stabilizers (or called a co-stabilizer) can also be utilized. For example, epoxy compounds; e.g. epoxidized soybean oil, epoxy esters, are strongly synergistic co-stabilizers for metal-based stabilizer system, as well as for organic stabilizers. A detailed description of stabilizers is available in PVC Technology, Fourth Edition, Chapters 9 and 10, W. V. Titow (Editor), Elsevier Applied Science Publishers, London and New York, 1984, and is hereby fully incorporated by reference.

In addition to the above stabilizers, various conventional antioxidants can be utilized in typical amounts with regard to the various polycarbonates and the various ethylene-based functional polymers. These compounds are well known to the art as well as to the literature.

The invention will be better understood by reference to the following examples.

The following recipes with ingredients as specified, are mechanically melt-mixed in a 6 inch electric mill at 215° C. for about 2 minutes and compression molded at 215° C. for one and a half minutes in a laboratory press.

In Examples 1–2, TempRite T-1310 CPVC, manufactured by The B F Goodrich Company, is masterbatch with stabilizer, antioxidants, with and without Bynel CXA 1123, an ethylene-based functional polymer available from DuPont. The ethylene-based functional compound has a melt index of 6.6 and comprises a blend of 92.5% of ethylene/28% vinyl acetate copolymer and 7.5% of ethylene/15% methacrylic acid copolymer. TempRite T-1310 CPVC contains 69.6% bound chlorine, and has an intrinsic viscosity of about 0.68 in tetrahydrofuran (THF). Each batch of 100 parts of CPVC contains 4 parts stabilizer, such as T-31 THERMO-LITE stabilizer, available from M&T which is dibutyl tin bisisooctylthioglycolate; also 1 part of Irganox 1010 which is 2,2-bis[[3,5-bis(1,1-Dimethylenthyl)-4-hydroxyphenyl]-1-oxopropoxy]methyl]-1,3-propanediyl 3,5-bis(1,1-dimethyl-ethyl)-4-hydroxybenzenepropanoate available from Ciba Geigy, and 0.5 parts of BHT which is (2,6-di-tert-butyl-4-methylphenol) available from Alrich. Example 1 does not contain any ethylene-based polymers. Example 2 contains 10 parts by weight of the ethylene-based copolymer blend.

In Examples 3-4, Lexan HP 2110-111, which is a high flow polycarbonate resin available from General Electric Company, having a weight average molecular weight of about 25,000, is melt mixed with 1 part by weight of Irganox 1010 and 0.5 parts BHT, with and without Bynel CXA 1123. Example 3 does not contain Bynel CXA resin. Example 4 contains 10 parts Bynel CXA 1123. The thermomechanical properties of these examples are listed in Table I.

TABLE I

|  | EXAMPLE | | | |
|---|---|---|---|---|
|  | 1 | 2 | 3 | 4 |
| CPVC TempRite T-1310 | 100 | 100 | 0 | 0 |
| Bynel CXA 1123 | 0 | 10 | 0 | 10 |
| Lexan HP 2110-111 | 0 | 0 | 100 | 100 |
| Izod Impact (ft-lb/in) (ASTM D256) | | | | |
| Notched | 0.5 | 0.6 | 5 | 8 |
| Unnotched | 1 | 2 | 18 | 24 |
| Heat Distortion Temperature (ASTM 684, 264 psi) (unannealed) | 99 | 94 | 130 | 130 |
| *Apparent Sheer Viscosity (Pa · S) @ 220° C. | | | | |
| Shear Rate = 85 sec$^{-1}$ | 4780 | 3110 | 10900 | 3460 |
| Shear Rate = 850 sec$^{-1}$ | 850 | 700 | 2580 | 1050 |

*The shear viscosity was measured using an Instron capillary rheometer, die diameter = 0.06 inch.
length/diameter ratio of die = 8.2, @ temperature 220° C.

The above data demonstrates that the Bynel CXA resin reduces the shear viscosity of unmodified CPVC and also very drastically lowers the shear viscosity of polycarbonate. At 220° C., the magnitude of shear viscosity of polycarbonate premixture containing 10 parts Bynel CXA resin (Example 4) is similar to that of unmodified CPVC resin (Example 1). This improves the processability of blending polycarbonate with CPVC resin as will be discussed below.

The compositions tested in Table II hereinbelow are identified as follows:

In Examples 5-7, each batch is formulated with 50 parts CPVC TempRite T-1310, with 2 parts T-31 THERMOLITE stabilizer, and also 50 parts Lexan HP 2110-111 with 1 part Irganox 1010 and 0.5 parts BHT antioxidant. Example 5 does not include Bynel CXA resin, while Examples 6 and 7 both contain 10 parts Bynel CXA 1123. Examples 5 and 6 are prepared by mixing all the ingredients simultaneously at 215° C. for 2 mins. Example 7 was prepared by premixing the Bynel CXA resin and polycarbonate and antioxidants at 215° C. to form a polycarbonate premixture, and then adding this premixture to the CPVC (plus stabilizer) at 215° C. The Izod impact strength and heat distortion temperature are listed in Table II.

TABLE II

|  | EXAMPLE | | |
|---|---|---|---|
|  | 5 | 6 | 7 |
| CPVC TempRite T-1310 | 50 | 50 | 50 |
| Bynel CXA 1123 | 0 | 10 | 10 |
| Lexan HP 2110-111 | 50 | 50 | 50 |
| Izod Impact (ft-lb/in.) (ASTM D256) | | | |
| Notched | 0.7 | 1.4 | 6 |
| Unnotched | 4 | 9 | 29 |
| Heat Distortion Temperature (°C.) (ASTM 684, 264 psi) (unannealed) | 112 | 101 | 110 |

The foregoing data demonstrate, that the blend, Example 7, prepared according to the present invention by mixing Bynel CXA resin with the polycarbonate at 215° C. to form a premixture and then mixing the same with the premix stabilized CPVC, exhibits better impact strength and also better heat distortion temperature, when compared with Example 6, an identical composition but wherein all of the ingredients were mixed simultaneously.

Examples 8-11 relate to blend compounds comprising CPVC TempRite T-1310 resin, polycarbonate, Bynel CXA, impact modifiers, and processing improvers. The detailed compositions and processes are described hereinbelow. In Examples 12 and 13, however, a commercially available stabilized CPVC compound, TempRite 3503, is used, a CPVC compound having a 67% Chlorine CPVC resin, and having an intrinsic viscosity of about 0.68 in THF.

EXAMPLE 8

A CPVC mixture was prepared by mixing at 215° C. in an electric two-roll mill, 70 parts by weight of CPVC TempRite T-1310 (69.6% chlorine) with 10 parts by weight of styrene-acrylonitrile, 15 parts by weight of ABS modifier, 5 parts by weight of chlorinated polyethylene impact modifier, 2.8 parts of T-31 THERMOLITE stabilizer and 0.5 parts of oxidized polyethylene lubricant. Various properties of this mixture are set forth in Table III.

EXAMPLE 9

A polycarbonate mixture was prepared by mixing at 215° C. in an electric mill, 30 parts by weight of polycarbonate with 5 parts by weight Bynel CXA 1123 resin. The polycarbonate was Lexan HP 2110-111 available from General Electric. The antioxidants used for polycarbonate premixture were 1 part by weight of Irganox 1010 available from Ciba-Geigi and 1 part by weight of BHT available from Alrich. The melted polycarbonate premixture was then mixed at 215° C. with 100 parts by weight of the stabilized CPVC-premixture as described in Example 8. Various properties are set forth in Table III.

EXAMPLE 10

The composition was prepared as described in Example 9, using the same polymers with appropriate additives. The polycarbonate premixture, however, consisted of 100 parts by weight of polycarbonate and 5 parts by weight of Bynel CXA 1123. Various properties are set forth in Table III.

EXAMPLE 11

The composition was prepared as described in Example 9, using the same polymers with appropriate additives. The polycarbonate premixture consisted of 200 parts by weight of polycarbonate, and 10 parts by weight of Bynel CXA 1123. Various properties are set forth in Table III.

EXAMPLE 12

A 100 parts by weight of TempRite 3503 was melt-mixed at 215° C. The TempRite 3503 was a CPVC compound based on 67% chlorine CPVC available from the BF Goodrich Company. Various properties are set forth in Table III.

EXAMPLE 13

The polycarbonate premixture was prepared as described in Example 9, using 60 parts of Lexan HP 2110-111, and 5 parts of Bynel CXA 1123. A 100 parts of TempRite 3503 as described in Example 12 was then mixed with the polycarbonate premixture at 215° C. Various properties are set forth in Table III.

TABLE III

| | EXAMPLE | | | | | |
|---|---|---|---|---|---|---|
| | 8 | 9 | 10 | 11 | 12 | 13 |
| Izod Impact (ft-lb/in.) (ASTM D256) | | | | | | |
| Notched | 2 | 6 | 7 | 8 | 1 | 4 |
| Unnotched | 17 | 25 | 40 | 35 | 11 | 33 |
| Heat Distortion Temperature °C. (ASTM D-684; 264 psi) | 86 | 96 | 105 | 118 | 88 | 99 |

It is obvious from Table III that the polymer mixtures, Examples 9–11, according to the present invention, containing a high chlorine CPVC resin TempRite T-1310, polycarbonate, and also fully compounded with impact modifier and processing improvers, have much better impact strength and heat distortion temperatures than that without a premixture of polycarbonate-Bynel CXA resin, i.e. Example 8. Example 13 containing a 67% chlorine CPVC compound TempRite 3503 with polycarbonate and Bynel CXA resin also had a much better impact strength and higher heat distortion temperature than that of TempRite 3503, Example 12.

While in accordance with the patent statues, a best mode and preferred embodiment have been set forth, the scope of the invention is not to be limited thereto, but rather by scope of the attached claims.

What is claimed is:

1. A thermoplastic high impact polymer alloy composition; comprising:
   from about 20% to about 70% by weight of a chlorinated poly(vinyl chloride) containing from 57% to about 75% by weight of chlorine therein;
   from about 10% to about 80% by weight of an aromatic polycarbonate;
   an effective amount of an ethylene-based functional polymer so that the polymer alloy has an Izod notch impact strength of at least 1.0 ft-lb/in;
   wherein said alloy amount is based upon the total weight of said chlorinated poly(vinyl chloride), said polycarbonate, and said ethylene-based functional polymer, and wherein said polymer alloy has a melt processing temperature of 230° C. or less.

2. A thermoplastic high impact polymer alloy composition according to claim 1, wherein the weight average molecular weight of said polycarbonate is from about 10,000 to about 200,000, wherein said ethylene-based functional polymer is a copolymer of ethylene with 1 or more monomers containing functional groups therein, and wherein the amount of said ethylene-based copolymer is from about 1% to about 15% by weight of said polymer alloy.

3. A thermoplastic high impact polymer alloy composition according to claim 2, wherein said ethylene-based functional copolymer is a blend of an ethylene-vinyl ester copolymer and at least one ethylene-vinyl and functional containing copolymer, wherein the amount of said ethylene-vinyl ester copolymer is from about 50% to about 100% by weight based upon the total weight of said ethylene-vinyl ester copolymer and said ethylene-vinyl and functional containing copolymer, wherein the amount of said ethylene-vinyl and functional containing copolymer is from about 0% or 1% to about 50% by weight, wherein said ester portion of said ethylene-vinyl ester copolymer contains a total of from 1 to 10 carbon atoms, wherein said vinyl and functional portion of said ethylene-vinyl and functional copolymer contains a vinyl organic acid or an organic anhydride having from 3 to 12 carbon atoms and wherein the weight of said vinyl ester portion of said ethylene-vinyl ester copolymer is from about 5% to about 50% by weight.

4. A thermoplastic high impact polymer alloy composition according to claim 3, wherein the amount of said CPVC is from about 30% to about 65% by weight of said polymer alloy, wherein the amount of said polycarbonate is from about 30% to about 70% by weight of said polymer alloy, wherein said polycarbonate has a weight average molecular weight of from about 10,000 to about 30,000.

5. A thermoplastic high impact polymer alloy composition according to claim 4, wherein the amount of said chlorine in said CPVC is from about 63% to about 72% by weight, wherein the total amount of said ethylene-based functional copolymers is from about 3% to about 10% by weight of said polymer alloy, and wherein said polymer alloy has a melt processing temperature of 220° C. or less.

6. A thermoplastic high impact polymer alloy composition according to claim 5, wherein said vinyl ester is vinyl acetate, wherein the amount of said vinyl acetate in said ethylene-vinyl acetate copolymer is from about 10% to about 35% by weight, wherein said vinyl and functional containing portion of said ethylene-vinyl and functional containing copolymer is a methacrylic acid, and wherein the amount of said methacrylic acid in said ethylene-methacrylic acid copolymer is from about 1% to about 25% by weight.

7. A low temperature melt processable CPVC polymer alloy composition; comprising:
   from about 20% to about 70% by weight of a chlorinated poly(vinyl chloride), said chlorinated poly(vinyl chloride) containing from about 57% to about 75% by weight of chlorine therein;
   from about 10% to about 80% by weight of an aromatic polycarbonate;
   an effective alloy amount of an ethylene-based functional polymer to provide a low melt polymer alloy having a processable temperature of 230° C. or less;
   and wherein said alloy amount is based upon the total weight of said chlorinated poly(vinyl chloride), said polycarbonate, and said ethylene-based functional polymer.

8. A low temperature melt processable CPVC polymer alloy composition according to claim 7, wherein the amount of said ethylene-based copolymer is from about 1% to about 15% by weight of said polymer alloy, wherein the weight average molecular weight of said polycarbonate is from about 10,000 to about 200,000, and wherein said ethylene-based functional polymer is a copolymer of ethylene and one or more monomers containing functional groups thereon.

9. A low temperature melt processable CPVC polymer alloy composition according to claim 8, wherein the amount of CPVC is from about 30% to about 65% by weight of said polymer alloy, wherein the amount of said polycarbonate is from about 30% to about 70% by weight of said polymer alloy, wherein said polycarbonate has a weight average molecular weight of from about 10,000 to about 30,000 and a melt processing temperature of from about 260° C. to about 300° C., wherein said ethylene-based functional polymer is a blend of an ethylene-vinyl ester copolymer and at least one ethylene-vinyl and functional copolymer, wherein the amount of said ethylene-vinyl ester copolymer is from about 50% to about 100% by weight based upon the total weight of said ethylene-vinyl ester copolymer and said ethylene-vinyl and functional containing copolymer, wherein the amount of said ethylene-vinyl and functional containing copolymer is from about 0% or 1% to about 50% by weight, wherein said ester portion of said ethylene-vinyl ester copolymer contains a total of from 1 to 10 carbon atoms, wherein the weight of said vinyl ester portion of said ethylene-vinyl ester copolymer is from about 5% to about 50% by weight, and wherein said vinyl and functional portion of said ethylene-vinyl and functional containing copolymer contains a vinyl organic acid or an organic anhydride having from 3 to 12 carbon atoms.

10. A low temperature melt processable CPVC polymer alloy composition according to claim 9, wherein the total amount of said ethylene-based functional polymers is from about 3% to about 10% by weight based upon the weight of said polymer alloy, wherein the amount of chlorine CPVC is from about 63% to about 72% by weight, wherein said vinyl ester is vinyl acetate, wherein the amount of said vinyl acetate in said ethylene-vinyl acetate copolymer is from about 10% to about 35% by weight, and wherein said vinyl and functional portion of said ethylene-vinyl and functional containing copolymer is methacrylic acid.

11. A low temperature melt processable CPVC polymer alloy composition according to claim 9, wherein said polymer alloy processable temperature is 215° C. or less.

12. A thermoplastic high-impact polymer alloy composition according to claim 2, including from about 1% to about 25% by weight of an impact modifier and including from about 0.1% to about 20% by weight of a viscosity improver.

13. A thermoplastic high-impact polymer alloy composition according to claim 6, including from about 2% to about 15% by weight of an impact modifier, and including from about 0.5% to about 10% by weight of a viscosity improver.

14. A process for making a low temperature melt processable CPVC polymer alloy composition comprising the steps of:

forming a polycarbonate premixture, said polycarbonate premixture containing a polycarbonate, and an effective amount of an ethylene-based functional polymer to provide said polycarbonate premixture with a melt processing temperature of 230° C. or less;

forming a CPVC premixture, and forming the low temperature melt processable CPVC polymer alloy by mixing said CPVC premixture with said polycarbonate premixture at a temperature of 230° C. or less.

15. A process according to claim 14, wherein the amount of said polycarbonate is from 10% to about 80% by weight of said polymer alloy, wherein the weight average molecular weight of said polycarbonate is from about 10,000 to about 200,000, wherein the amount of said ethylene-based functional polymer is from about 1% to about 15% by weight of said polymer alloy, including melt processing said polycarbonate premixture at a temperature of 230° C. or less, wherein the amount of said CPVC is from about 20% to about 70% by weight of said polymer alloy, wherein said CPVC has a chlorine content of from about 57% to about 75% by weight, and including melt processing said CPVC premixture at a temperature of 230° C. or less.

16. A process according to claim 15, wherein said ethylene-based functional polymer is a blend of an ethylene-vinyl ester and an ethylene-vinyl and functional containing copolymer, wherein said vinyl ester portion of said ethylene-vinyl ester copolymer has a total of from 1 to 8 carbon atoms, wherein the amount of said ethylene-vinyl ester copolymer is from about 50% to about 100% by weight based upon the total amount of said ethylene-vinyl ester copolymer and said ethylene-vinyl and functional containing copolymer, and wherein the amount of said ethylene-vinyl and functional containing copolymer is from about 0% or 1% to about 50% by weight, and wherein said vinyl and functional portion of said ethylene-vinyl and functional copolymer is a vinyl organic acid or an organic anhydride having from 3 to 12 carbon atoms.

17. A process according to claim 16, wherein the amount of said CPVC is from about 30% to about 65% by weight of said polymer alloy, including and impact modifier, wherein the amount of said impact modifier is from about 1% to about 25% by weight of said polymer alloy, wherein the amount of said polycarbonate is from about 30% to about 70% by weight of said polymer alloy, wherein said polycarbonate has a weight average molecular weight of from about 10,000 to about 30,000, wherein the amount of said chlorine in said CPVC is from about 63% to about 72% by weight, and wherein the total amount of said ethylene copolymers is from about 3% to about 10% by weight of said polymer alloy, and wherein the Izod notch impact strength of said polymer alloy is at least 1.0 ft-lb/in.

18. A thermoplastic high impact polymer alloy made according to the process of claim 14.

19. A thermoplastic high impact polymer alloy made according to the process of claim 17.

20. A low-temperature melt-processable CPVC polymer alloy composition according to claim 10, including from about 0.1% to about 20% by weight of a viscosity improver polymer and from about 1% to about 25% by weight of an impact modifier.

* * * * *

UNITED STATES PATENT AND TRADEMARK OFFICE
CERTIFICATE OF CORRECTION

PATENT NO. : 4,680,343
DATED : July 14, 1987
INVENTOR(S) : Biing-lin Lee

It is certified that error appears in the above-identified patent and that said Letters Patent is hereby corrected as shown below:

Claim 16, line 6, "1 to 8 carbon atoms" should read ---1 to 10 carbon atoms---.

Signed and Sealed this

Twenty-second Day of December, 1987

Attest:

DONALD J. QUIGG

*Attesting Officer*  *Commissioner of Patents and Trademarks*